United States Patent [19]

Friedrich

[11] Patent Number: 5,213,900

[45] Date of Patent: * May 25, 1993

[54] COOK-IN FILM WITH IMPROVED SEAL STRENGTH

[75] Inventor: Steven G. Friedrich, Chalfont, Pa.

[73] Assignee: W.R. Grace & Co.-Conn., Duncan, S.C.

[ * ] Notice: The portion of the term of this patent subsequent to Aug. 8, 2006 has been disclaimed.

[21] Appl. No.: 640,200

[22] Filed: Jan. 10, 1991

Related U.S. Application Data

[63] Continuation-in-part of Ser. No. 498,175, Mar. 23, 1990, abandoned.

[51] Int. Cl.$^5$ .............................................. B32B 27/08
[52] U.S. Cl. ................................ 428/474.4; 428/34.1; 428/34.9; 428/475.5
[58] Field of Search .................. 428/474.4, 475.8, 34.8, 428/34.9, 349, 475.5, 36.91, 34.1; 426/412; 525/183

[56] References Cited

U.S. PATENT DOCUMENTS

| | | | |
|---|---|---|---|
| 3,355,319 | 11/1967 | Rees | 428/349 |
| 3,845,163 | 10/1974 | Murch | 525/183 |
| 4,303,711 | 12/1981 | Erk et al. | 428/34.8 |
| 4,361,628 | 11/1982 | Krueger et al. | 428/475.8 |
| 4,411,919 | 10/1983 | Thompson | 426/412 |
| 4,469,742 | 9/1984 | Oberle et al. | 428/215 |
| 4,568,580 | 2/1986 | Ghiradello et al. | 428/34.9 |
| 4,601,929 | 7/1986 | Erk et al. | 428/34.8 |
| 4,606,922 | 8/1986 | Schirmer | 426/412 |
| 4,735,855 | 4/1988 | Wofford et al. | 428/475.8 |
| 4,777,095 | 10/1988 | Kondo et al. | 428/476.1 |
| 4,855,183 | 8/1989 | Oberle | 428/475.8 |
| 4,857,399 | 8/1989 | Vicik | 428/474.4 X |
| 4,857,408 | 8/1989 | Vicik | 428/474.4 |

FOREIGN PATENT DOCUMENTS 028585 12/1987 European Pat. Off. .
0331509 6/1989 European Pat. Off. .

OTHER PUBLICATIONS

US FDA Status of Ciba-Geigy, CITA-Geigy/IRGANOX 2, Dec. 1988, p. 2.

Primary Examiner—Thomas J. Herbert, Jr.
Attorney, Agent, or Firm—William D. Lee, Jr.; Leigh P. Gregory; Mark B. Quatt

[57] ABSTRACT

Hot and cold heat seals are obtained in a multiple layer cook-in film from which packages such as bags or casings can be made wherein the films have a first food contact layer that adheres during cook-in to a contained meat product and wherein the first layer comprises a blend of a first and a second polyamide, preferably with a small amount of an antioxidant.

10 Claims, No Drawings

COOK-IN FILM WITH IMPROVED SEAL STRENGTH

This application is a continuation-in-part of U.S. Ser. No. 498,175, filed Mar. 23, 1990, now abandoned.

BACKGROUND OF THE INVENTION

This invention relates generally to thermoplastic films suitable for cook-in packaging, and more particularly to cook-in food films having food contact surface characteristics which promote binding adherence to a contained food product during cook-in The films of the invention exhibit improved hot and cold heat seal strength as compared to known films having a food contact layer that bindingly adheres during cook-in to a contained meat product. Such known films include food contact layers comprising an ethylene acrylic acid copolymer or an ethylene methacrylic acid copolymer, with or without metal salt neutralization; a polyamide; or a mixture thereof.

The food packaging industry needs a packaging film from which bags and casings can be made which are of improved structural soundness such that they may be fully characterized as cook-in. Further, a precooked food product attractively packaged inside the film within which it was precooked is desirable. The term "cook-in" as used herein is intended to refer to packaging material structurally capable of withstanding exposure to cook-in time-temperature conditions while containing a food product. Cook-in packaged foods are essentially foods cooked in the package in which they are distributed to the consumer and which may be consumed with or without warming. Cook-in time-temperature conditions typically refer to a long slow cook, for example submersion in hot water at 55°–65° C. for 1–4 hours, and such conditions are representative of institutional cooking requirements. Submersion at 70°–100° C. for up to about 12 hours probably represents the limiting case. Under such conditions, a cook-in packaging material should maintain seal integrity, i.e. any heat sealed seams should resist being pulled apart during cook-in. As a corollary, the film is heat sealable to itself. Additionally, the packaging film is substantially conformable to the contained food product. Preferably, this substantial conformability is achieved by the film being heat shrinkable under these conditions so as to form a tightly fitting package. In other words, in an advantageous embodiment, the film is heat shrinkable under these time-temperature conditions, i.e. the film possesses sufficient shrink energy such that submerging the packaged food product in hot water will shrink the packaging film snugly around the contained product, representatively up to about 55% monoaxial or biaxial shrinkage.

Also, the film should have food product adherence to restrict "cook-out" or collection of juices between the surface of the contained food product and the food contact surface of the packaging material during cook-in, thereby increasing product yield. More particularly, in the types of multilayer films wherein the first "sealing and food contact" layer is of the type of material that adheres to a contained food product during cook-in, this first layer may alternatively be referred to as the "adhering layer". As used herein, the term "adhere" is intended to mean that the food contact surface of the film bonds during cook-in to the contained food product to an extent sufficient to substantially prevent accumulation of fluids between the film and the contained product.

A heat shrinkable, cook-in film is described in U.S. Pat. No. 4,469,742 (1984) to Oberle et al. This patent relates to a cook-in shrink film that includes a first "sealing or food contact" layer of nonlipophillic polymeric material having a softening point greater than that of the following shrink layer; a second layer, melt bonded to the first layer, of an ethylene homopolymer or copolymer; a third or adhesive layer, melt bonded to the second layer, of a chemically modified polyethylene being irradiatively crosslinkable and having functional groups with a relatively strong affinity for the following barrier layer; a fourth or barrier layer, melt bonded to the third layer, of a hydrolyzed ethylene vinyl acetate copolymer; a fifth or adhesive layer as in said third layer, melt bonded to the fourth layer; and a sixth or abuse layer, melt bonded to the fifth layer. In one embodiment, the first "sealing and food contact" layer is a metal salt neutralized copolymer of an olefin and a carboxylic acid, representatively Surlyn ®. This patent explains Surlyn is the type of material that adheres to a contained meat product during cook-in. Thus, this Surlyn layer also functions as a protein-adhering layer. The patent also describes a method for making the film including full coextrusion and selective irradiation and orientation.

In the conventional method of manufacturing heat shrinkable film as described in the Oberle et al patent, a tubular orientation process is utilized wherein a primary tube of the film is biaxially oriented by stretching with internal pressure in the transverse direction and with the use of pinch rolls at different speeds in, the machine direction. Then the stretched bubble is collapsed, and the film is wound up as flattened, seamless, tubular film to use later to make bags, e.g. either end-seal bags typically made by transversely heat sealing across the width of flattened tubing followed by severing the tubing so that the transverse seal forms the bag bottom, or side-seal bags in which the transverse heat seals form the bag sides and one edge of the tubing forms the bag bottom. Such bags are typically used by placing the food product in the bag, evacuating the bag, either heat sealing the bag mouth or gathering and applying a metal clip around the gathered mouth of the bag to form a seal, and then immersing the bag in hot water at approximately the same temperature at which the film was stretch oriented, typically about 160° to 205° F. (61° to 96° C.), hot water immersion being one of the quickest and most economical means of transferring sufficient heat to the film to shrink it uniformly. Alternatively, the bag may serve as a liner of a cooking mold.

Also of interest is a plastic, adhering cook-in package such as the casing described in U.S. Pat. No. 4,606,922 (1986) to Schirmer, relating to a method for enhancing yield of a cook-in packaged meat product that includes first providing an adhering cook-in container including a flexible thermoplastic envelope being substantially conformable to a contained meat product and having an inner meat-contacting surface of a selectively irradiated ionomer of a metal salt neutralized copolymer of ethylene and acrylic acid or methacrylic acid, then conforming the container about a selected meat product and cooking the packaged product, whereupon the inner surface of the envelope bonds to the meat product substantially to prevent cook-out of fluids. Representatively, the ionomer of the inner binding surface is Surlyn, and a typical casing or envelope is of the structure: nylon 6/adhesive/Surlyn.

Also of interest is a flexible plastic adhering cook-in package described in U.S. Pat. No. 4,411,919 (1983) to Thompson, relating to a method for enhancing yield of cook-in packaged meat product, comprising: (a) providing an adhering cook-in package comprising a flexible plastic container being substantially conformable to a selected meat product and having an inner meat product contacting surface of polymeric olefin having been subjected to an energetic radiation surface treatment in the presence of oxygen sufficient to cause said inner surface to adhere to the meat product during cook-in, said container having been formed from hot blown tubular film; (b) conforming said package about a selected meat product; and (c) cooking the packaged product, whereupon said inner surface adheres to said meat product to substantially prevent cook-out of fluids therefrom.

Also of interest is the film described in U.S. Pat. No. 4,303,711 (1981) to Erk and Korlatzki, which relates to a tubular film consisting of biaxially stretched plastic material for packing and casing paste type foodstuffs that either, after packing, are heated or are packed in a hot fluid state, comprising a mixture of approximately 50-99 parts by weight of at least one aliphatic polyamide having a glass transition point in the dry state of at least 48° C., and a glass transition point after moisture absorption of 3° C. or less and approximately 1-50 parts by weight of one or more members of the group consisting of an ionomer resin, a modified ethylene/vinyl acetate acid copolymer and a modified polyolefin. Another patent to Erk and Korlatzki is U.S. Pat. No. 4,601,929 (1986), relating to a single layer of polyamide film for packing and casing foodstuffs in paste form, especially foodstuffs that are packed when hot or are subject to heat treatment after packing.

Also of interest is the film described in U.S. Pat. No. 4,568,580 (1986) to Ghiradello et al, relating to an article of manufacture for packaging food products comprising: (a) a first film section, said section having at least one surface comprising a copolyamide obtained by random copolymerization of precursor monomers of at least two different polyamides, said copolyamide having a melting point measured on a Perkin Elmer DSC-2 device in the range from 120° C. to 240° C.; (b) a second film section, said section being a section of a film having surface comprising a copolyamide as defined in subparagraph (a) above; and, (c) at least one heat weld between the copolyamide surfaces of said first and second sections thereby forming said articles for packaging food products, said article being capable of withstanding, without suffering damage to said heat weld, heat treatment at temperatures from 70° C. to 120° C. for at least 10 minutes.

Also of interest is U.S. Pat. No. 4,855,183 (Oberle) which discloses a cook-in film having a first food contact layer comprising a polyamide composition.

Of general interest are the disclosure of U.S. Pat. No. 3,355,319 issued Nov. 28, 1967 to Rees for "Self-Supporting Film with a Heat-Sealable Coating of An Ionic Copolymer Of An Olefin and Carboxylic Acid With Metal Ions Distributed Throughout" and U.S. Pat. No. 3,845,163 issued Oct. 29, 1974 to Murch for "Blends of Polyamides and Ionic Copolymer". Both of these patents are assigned to E. I. du Pont de Nemours and Company, and relate to metal salt neutralized copolymers of an alpha olefin having the formula $RHC=CH_2$ wherein R is H or $C_1$ to $C_8$ alkyl and an alpha-beta-ethylenically unsaturated carboxylic acid. Such materials are marketed by du Pont under the name, Surlyn ®.

The present invention is directed to multiple layer cook-in film from which packages, such as casings or bags, can be made which exhibit improved heat seal strength, yet still retain at least some food adherence characteristics and exhibit improved hot and cold heat seal characteristics as compared to known films having a Surlyn or single polyamide food contact surface that adheres to a food product during cook-in, such as some of the films described in U.S. Pat. No. 4,606,922 and some of the films described in U.S. Pat. Nos. 4,469,742 and 4,855,183, all of which are discussed above. The multilayer film structure of the present invention has a "sealing and food contact" layer, more preferably has the minimal structure: (sealing and food contact layer)/(barrier layer), in one advantageous embodiment has the minimal structure: (sealing and food contact layer)/(barrier layer)/(abuse layer), and in another advantageous embodiment has the minimal structure: (sealing and food contact layer)/(second layer)/(barrier layer)/(abuse layer), such composite structures being advantageous to achieve the desired composite properties of the packing film.

SUMMARY OF THE INVENTION

Accordingly, there is provided a multiple layer, cook-in film having a first food contact layer having been subjected to an energetic radiation surface treatment, said first layer functioning as an adhering layer, and wherein said first layer comprises a blend of a first polyamide and a second polyamide.

Also, there is provided a method for improving the heat seal strength of multiple layer, cook-in film having a first food contact layer (a) that functions as an adhering layer, said method comprising (1) providing for said first layer (a) with a blend of a first polyamide and a second polyamide (2) extruding said first layer into a multiple layer film, and (3) prior to or after the extruding of said first layer (a), subjecting said first layer (a) to an energetic radiation surface treatment.

DETAILED DESCRIPTION OF THE INVENTION

The First Food Contact Or Adhering Layer

The cook-in film may be made from any of a variety of multilayer cook-in packaging films so long as the first food contact layer of the film comprises a blend of a first polyamide and a second polyamide. In an advantageous embodiment, the composition in said first layer is a blend of between about 10% and 90% nylon 12 and between about 90% and 10% nylon 6/12. A more preferred blend is 20% to 80% nylon 12 and 80% to 20% nylon 6/12. Preferably, the first layer also includes between about 0.010% and 5% of an antioxidant such as Irganox ® 1098. A more preferable range for the antioxidant is between 0.15% and 1.0%, even more preferably between 0.15% and 0.75%. All percentages given herein are by weight of the appropriate layer or blend.

The first food contact layer desirably has a thickness of about 0.2 to 1.0 mils (about 5 to 25 micrometers) for a suitable multilayer cook-in packaging film. The food contact layer bonds or adheres to the contained meat product during cook-in, thereby preventing cook-out of fluids from the contained meat product. Thus, the food contact layer is alternatively referred to as the adhering layer.

The food contact layer can optionally be subjected to an energetic radiation treatment, including, but not limited to corona discharge, plasma, flame, ultraviolet, and high energy electron treatment. For instance, the food contact layer may be selectively irradiated with high energy electrons which advantageously may be accomplished during irradiation of the overall multi-layer film structure for cook-in integrity, as further discussed below. A suitable radiation dosage of high energy electrons is in the range of up to about 12 megarads (MR), more preferably about 2–9 MR. Radiation dosages are referred to herein in terms of the radiation unit "RAD", with one million RADS or a megarad being designated as "MR".

The polyamides employed in the first food contact layer of the films of this invention are well known in the art and embrace those resins commonly designated as nylons. Typically, in the conventional method, some polyamide resins are made by condensation of equimolar amounts of a saturated dicarboxylic acid containing from about 2 to 10 carbon atoms with an alkylene diamine, in which the alkylene group contains from about 2 to 10 carbon atoms. Excess diamine may be used, thereby giving an excess of amine end groups over carboxyl end groups in the polyamide. Other polyamide resins are polymerized by addition reactions of ring compounds that contain both acid and amine groups on the monomer. Examples of suitable polyamides include, but are not limited to polycaprolactam (nylon 6), (nylon 6/9), (nylon 6/10), the polycondensation product of hexamethylenediamine and a 12-carbon dibasic acid (nylon 6/12), the polymerization product of lauric lactam of cyclododecalactam with 11 methylene units between the linking —NH—CO— groups in the polymer chain (nylon 12), the polyaddition product of the monomer 11-aminoundecanoic acid (nylon 11), poly-hexamethylene adipamide (nylon 66), (nylon 69), poly-hexamethylene sebacamide (nylon 610), and (nylon 612). It is also possible to use in this invention polyamides prepared by the copolymerization of two of the above polymers or terpolymerization of the above polymers or their components. A very desirable nylon is Vestamid ®, which is a nylon 12 supplied by Chemische Werke Huls AG, Germany. Also, Rilsan ® nylon 11 or Rilsan ® nylon 12, supplied by Atochem, Inc., Polymers Division, Glen Rock, N.J., may be advantageously employed. Also, Grilamid ® nylon 12 from Emser Industries, Sumter, S.C. may be advantageously employed. A nylon 12/12 available from Du Pont is also useful in the present invention.

Suitable "polyethylenes" employed in other layers as discussed below are the families of resins obtained by substantially polymerizing the gas ethylene, $C_2H_4$. By varying the comonomers, catalysts and methods of polymerization, properties such as density, melt index, crystallinity, degree of branching and cross-linking, molecular weight and molecular weight distribution can be regulated over wide ranges. Further modifications are obtained by other processes such as halogenation, and compounding additives. Low molecular weight polymers of ethylene are fluids used as lubricants; medium weight polymers are waxes miscible with paraffin; and the high molecular weight polymers are resins generally used in the plastics industry. Polyethylenes having densities ranging from about 0.900 g/cc to about 0.935 g/cc, more preferably to about 0.928 g/cc, are called low density polyethylenes (LDPE), while those having densities from about 0.936 g/cc to about 0.940 g/cc are called medium density polyethylenes (MDPE), and those having densities from about 0.941 g/cc to about 0.965 g/cc and over are called high density polyethylenes (HDPE). The older, classic low density types of polyethylenes are usually polymerized at high pressures and temperatures whereas the older, classic high density types are usually polymerized at relatively low temperatures and pressures.

The term "linear low density polyethylene" (LLDPE) as used herein for a type of polyethylene employed in the first food contact layer (or another layer) refers to the newer copolymers of ethylene with one or more comonomers selected from $C_4$ to $C_{10}$ alpha olefins such as butene-1, pentene-1, hexene-1, octene-1, etc. in which the molecules thereof comprise long chains with few side chains or branches achieved by low pressure polymerization. The side branching which is present will be short as compared to non-linear polyethylenes. The molecular chains of a linear polymer may be intertwined, but the forces tending to hold the molecules together are physical rather than chemical and thus may be weakened by energy applied in the form of heat. Linear low density polyethylene has a density in the range from about 0.911 g/cc to about 0.935 g/cc, more preferably in the range of from about 0.912 g/cc to about 0.928 g/cc for film making purposes. The melt flow index of linear low density polyethylene generally ranges from between about 0.1 to about 10 grams per ten minutes and preferably between from about 0.5 to about 3.0 grams per ten minutes (ASTM D 1238). Linear low density polyethylene resins of this type are commercially available and are manufactured in low pressure vapor phase and liquid phase processes using transition metal catalysts. LLDPE is well known for its structural strength and anti-stress cracking properties. Also, very low density linear low density polyethylenes (VLDPE) may be employed, and such have a density from about 0.910 g/cc to about 0.860 g/cc, or even lower.

The term "ethylene vinyl acetate copolymer" (EVA) as used herein for a type of polyethylene refers to a copolymer formed from ethylene and vinyl acetate monomers wherein the ethylene derived units in the copolymer are present in major amounts and the vinyl acetate derived units in the copolymer are present in minor amounts. EVA is known not only for having structural strength, as LLDPE does, but also it is known for providing excellent adhesion to an adjacent layer, which may decrease or even obviate the need for an "adhesive".

The term "ethylene methylacrylate copolymer" (EMA) as used herein for a type of polyethylene, refers to a copolymer formed from ethylene and methylacrylate monomers.

The term "ethylene ethylacrylate copolymer" (EEA) as used herein for a type of polyethylene, refers to a copolymer formed from ethylene and ethylacrylate monomers.

The term "ethylene butyl acrylate copolymer" (EBA) as used herein for a type of polyethylene, refers to a copolymer formed from ethylene and butyl acrylate monomers.

Blends of all families of polyethylenes, such as blends of EVA, EMA, EEA, EBA, VLDPE, EMAA (ethylene methacrylic acid copolymer) and LLDPE, may also be advantageously employed.

The term "oriented" is also herein used interchangeably with the term "heat shrinkable" with these terms designating a material which has been stretched and set by cooling while substantially retaining its stretched dimensions. An oriented (i.e. heat shrinkable) material will tend to return to its original unstretched (unextended) dimensions when heated to an appropriate elevated temperature.

Returning to the basic process for manufacturing the film as discussed above, it can be seen that the film, once coextruded and initially cooled to by, for example, cascading water quenching, is then reheated to within its orientation temperature range and oriented by stretching. The stretching to orient may be accomplished in many ways such as, for example, by "blown bubble" techniques or "tenter framing". These processes are well known to those in the art and refer to orientation procedures whereby the material is stretched in the cross or transverse direction (TD) and/or in the longitudinal or machine direction (MD). After being stretched, the film is quickly quenched while substantially retaining its stretched dimensions to cool the film rapidly and thus set or lock in the oriented molecular configuration.

Of course, if a film having little or no orientation is desired, e.g. nonoriented or non-heat shrinkable film, the film may be formed from a nonorientable material or, if formed from an orientable material may be "hot blown". In forming a hot blown film the film is not cooled immediately after extrusion or coextrusion but rather is first stretched shortly after extrusion while the film is still at an elevated temperature above the orientation temperature range of the material. Thereafter, the film is cooled, by well known methods. Those of skill in the art are well familiar with this process and the fact that the resulting film has substantially unoriented characteristics. Other methods for forming unoriented films are well known. Exemplary, is the method of cast extrusion or cast coextrusion which, likewise, is well known to those in the art.

Whichever film has been made (the nonoriented molecular configuration or the stretch oriented molecular configuration), it may then be subjected to an energetic radiation surface treatment, which is advantageously provided by a high energy electron treatment. For instance, it may be irradiated, for example by guiding it through the beam of an electron accelerator to receive a radiation dosage up to about 12 megarads (MR), move preferably a dosage in the range of about 2-9 megarads (MR), and then it may be stored in rolls and utilized to package a wide variety of items. In this regard, the product to be packaged may first be enclosed in the material by heat sealing the film to itself where necessary and appropriate to form a pouch or bag and then inserting the product therein. If the material was manufactured by "blown bubble" techniques the material may still be in tubular form or it may have been slit and opened up to form a sheet of film material. Alternatively, a sheet of the material may be utilized to overwrap the product. These packaging methods are all well known to those of skill in the art.

If the material is of the heat shrinkable type, then thereafter the enclosed product may be subjected to elevated temperatures, for example, by passing the enclosed product through a hot air or hot water tunnel. This causes the enclosing heat shrinkable film to shrink around the product to produce a tight wrapping that closely conforms to the contour of the product. As stated above, the film sheet or tube may be formed into bags or pouches and thereafter utilized to package a product. In this case, if the film has been formed as a tube it may be preferable first to slit the tubular film to form a film sheet and thereafter form the sheet into bags or pouches. Such bag or pouch forming methods, likewise, are well known to those of skill in the art.

The above general outline for manufacturing of films is not meant to be all inclusive since such processes are well known to those in the art. For example, see U.S. Pat. Nos. 4,274,900; 4,229,241; 4,194,039; 4,188,443; 4,048,428; 3,821,182 and 3,022,543. The disclosures of these patents are generally representative of such processes and are hereby incorporated by reference.

Many other process variations for forming films are well known to those in the art. For example, multiple layers may be first coextruded with additional layers thereafter being extrusion coated thereon. Or two multilayer tubes may be coextruded with one of the tubes thereafter being extrusion coated or laminated onto the other. The extrusion coating method of film formation is preferable to coextruding the entire film when it is desired to subject one or more layers of the film to a treatment which may be harmful to one or more of the other layers. Exemplary of such a situation in a case where it is desired to irradiate with high energy electrons one or more layers of a film containing a barrier layer comprised of one or more copolymers of vinylidene chloride (i.e. saran), such as of vinylidene chloride and vinyl chloride or such as of vinylidene chloride and methyl acrylate. In other words, the barrier layer includes a saran layer in addition to or instead of an EVOH layer. Those of skill in the art generally recognize that irradiation with high energy electrons is generally harmful to such saran barrier layer compositions, as irradiation may degrade and discolor saran, making it turn brownish. Thus, if full coextrusion followed by high energy electron irradiation of the multilayer structure is carried out on a film having a barrier layer containing a saran layer, the irradiation should be done at low levels with care. Alternatively, this situation may be avoided by using extrusion coating. Accordingly, by means of extrusion coating, one may first extrude or coextrude a first layer or layers, subject that layer or layers to high energy electron irradiation and thereafter extrusion coat the saran barrier layer and, for that matter, other later layers (which may or may not have been irradiated) sequentially onto the outer surface of the extruded previously irradiated tube. This sequence allows for the high energy electron irradiative treatment of the first and later layer or layers without subjecting the saran barrier layer to the harmful discoloration effects thereof.

Thus, as used herein the term "extrusion" or the term "extruding" is intended to include coextrusion, extrusion coating, or combinations thereof.

EXAMPLE 1

An embodiment of the invention is a composite tubular film having the multilayer structure: (inside) A/B/C/D/C/E (outside) where A is primarily a food contact layer, B is a second layer, C is primarily an adhesive layer, D is primarily a barrier layer, and E is primarily an abuse layer. This film, when in a tubular configuration, is especially suited for bag making or for the manufacture of casings. The material of layer A (the first food contact layer) is made as discussed above and is representatively a blend of 50% nylon 6/12, 49.65% nylon 12, and 0.35% antioxidant (Irganox 1098). This first layer A is alternatively referred to as the adhering layer. Layer B, the second layer is typically melt bonded to the first layer and is representatively an ethylene homopolymer or copolymer such as an ethylene vinyl acetate copolymer (EVA), an ethylene butyl acrylate copolymer (EBA), a linear low density polyethylene (LLDPE), a blend of EVA and LLDPE, a blend of EBA and LLDPE, very low density polyethylene (VLDPE), Plexar, or a blend of Plexar and LLDPE. An especially preferred composition for the second layer is a blend of 80% polymeric adhesive (Bynel CXA 4104) based on ethylene butene copolymer, and 20% very low density polyethylene (Attane 4003) with a density of about 0.905 grams/cc. The second layer is preferably a multifunctional layer in that it can provide moisture barrier protection for the barrier layer, and can also contribute to the overall shrink characteristics and toughness of the final film. The second layer inherently acts as an adhesive layer between the food contact layer and the adhesive or barrier layer. Barrier layer D is representatively composed of Saran (a vinylidene chloride copolymer) layer, a hydrolyzed ethylene vinyl acetate copolymer (EVOH) layer, or both a saran layer and an EVOH layer. When the barrier layer is composed of both a saran layer and an EVOH layer, a suitable adhesive may be employed between them. Adhesive interlayers C are melt bonded adjacent each side of the barrier layer to provide delamination resistance of the barrier layer in the tubular film under cook-in conditions. An especially preferred adhesive is Bynel 3062, an anhydride grafted EVA-based adhesive from du Pont. The adhesive may be any of the various adhesives well known in the art of film making. Representatively, a suitable adhesive is composed of a copolymer or a homopolymer of olefin (preferably that is crosslinkable such as by irradiation) that has been modified to provide functional groups with a relatively strong affinity for adjacent layer, i.e. the barrier material. Abuse layer E isolates the barrier layer from adverse moisture contact and provides mechanical abuse resistance and representatively is an ethylene vinyl acetate copolymer having a vinyl acetate content of up to about 25% preferably about 5-12%, more preferably about 6%, or a blend thereof with LLDPE or VLDPE. An especially preferred composition for abuse layer E is a blend of about 60% VLDPE (Attane 4003) and 40% ethylene butyl acrylate copolymer (EBA) (EA 705-009 with 5% butyl acrylate comonomer, available from Quantum/USI). All layers within the film are typically melt bonded to the respective adjacent layers. Representatively, the film will have an overall thickness prior to orientation of about 10–30 mils (about 254–762 micrometers), food contact layer A will have a thickness of about 2–6mils (about 51–152 micrometers), second layer B about 2–8 mils (about 51–203 micrometers), adhesive layers C about 0.25–1.5 mils (about 6.3–76 micrometers) each, barrier layer D about 0.75–2 mils (about 19–102 micrometers), and abuse layer E about 3–8 mils (about 76–203 micrometers).

In the embodiment wherein the film of the invention is a shrink film having a barrier layer comprising EVOH, the film may be made by a tubular process similar to that described for the Oberle et al patent, cited above, wherein the tubular film is fully coextruded, i.e. all layers are simultaneously coextruded, using the conventional blown bubble technique. Full coextrusion is advantageous in that all layers of the multilayer film are directly melt joined for enhanced interlayer strength under cook-in conditions. After cooling, the coextruded tube is flattened and then guided through an ionizing radiation field, for example through the beam of a high energy electron accelerator to receive a radiation dosage in the range of up to about 12 megarads (MR). Irradiation via this high energy electron treatment of the overall multilayer film structure achieves the required energetic radiation treatment of the food contact layer. As the film in this embodiment is a heat shrinkable film, in general, irradiation should be sufficient to crosslink the irradiatively crosslinkable layers of the film to increase strength of the shrink layer without substantially diminishing elongation properties, and to provide delamination resistance of the film during cook-in conditions. After irradiation, the tube is then fed into a hot water tank having water at about 190°–212° F. (88°–100° C.) to soften the film for orientation; then it passes through pinch rolls and is inflated into a bubble and stretched to a point where the film thickness is representatively 2 mils (about 51 micrometers). Suitable thickness will range from about 1–4 mils (about 25–102 micrometers) with a stretch ratio of about 5–12:1, which will impart a shrink capacity of up to about 55% biaxial free shrinkage at 185° F. (85° C.) (by ASTM D2732). As the stretched bubble emerges from the hot water tank it cools rapidly in the air and then is collapsed and rolled up into flattened tubing. It is from this tubing of this final oriented thickness that bags are made as discussed above.

The invention may be further understood by reference to the additional Examples given in Table 2.

These Examples generally have the structure Sealant/80% ADH$_1$+20% VLDPE$_1$/ADH$_2$/EVOH$_1$/ADH$_2$/60% VLDPE$_1$+40% EVA$_1$.

Table 1 identifies and describes the resins used in the Examples.

Table 2 lists each of the Examples with the specific composition of the sealant layer.

TABLE 1

| Resin or Material | Commercial Name | Description | Supplier |
|---|---|---|---|
| I$_1$ | Surlyn A 1650 | Zinc Salt of Ethylene/ Methacrylic Acid Copolymer | DuPont |
| PA$_1$ | Vestamid L1801F | Polylauryl Lactam (Nylon 12) | Nuodex |
| PA$_2$ | Grilon CF6S | Nylon 6/12 | Emser |
| PA$_3$ | UBE 3024 B | Nylon 12 | UBE |
| PA$_4$ | UBE 7024 B | Nylon 6/12 | UBE |
| PA$_5$ | DuPont | Nylon 12/12 | DuPont |
| PA$_6$ | UBE 7128 B | Nylon 6/12 | UBE |
| PA$_7$ | UBE 7028 B | Nylon 6/12 | UBE |
| VLDPE$_1$ | Attane 4003 | Very Low Density Polyethylene (Ethylene-Octene Copolymer) | Dow |
| EVOH$_1$ | EVAL LC-E105A | Ethylene Vinyl Alcohol Copolymer (44 Mole % Ethylene) | EVALCA |
| EBA$_1$ | EA 705-009 Copolymer | Ethylene Butyl Acrylate Copolymer (5 Wt. % BA) | Quantom/ USI |
| AS$_1$ | Irganox 1098 | Antioxidant/ Stabilizer | CIBY/GEIGY |

TABLE 1-continued

| Resin or Material | Commercial Name | Description | Supplier |
|---|---|---|---|
| $Adh_1$ | Bynel CXA 4104 | Antihydride Grafted Polyolefin in Ethylene-Butene Copolymer | DuPont |
| $Adh_2$ | Bynel 3062 | Anhydride Grafted Polyolefin in Ethylene Vinyl Acetate Copolymer | DuPont |

TABLE 2

| Example | Sealant Composition | Sealant Thickness Before Orientation (Mils) |
|---|---|---|
| 2 (Comparative) | 80% $PA_1$ + 20% $I_1$ | 3.35 |
| 3 (Comparative) | 40% $PA_1$ + 40% (99.25% $PA_1$ + 0.75% $AS_1$) + 20% $I_1$ | 3.35 |
| 4 (Comparative) | 80% (99.25% $PA_1$ + 0.75% $AS_1$) + 20% $I_1$ | 3.35 |
| 5 (Comparative) | 80% $PA_3$ + 20% $I_1$ | 3.35 |
| 6 (Comparative) | 80% $PA_4$ + 20% $I_1$ | 3.35 |
| 7 (Comparative) | 80% $PA_5$ + 20% $I_1$ | 3.35 |
| 8 | 50% $PA_2$ + 50% $PA_1$ | 3.35 |
| 9 | 50% $PA_2$ + 50% $PA_1$ | 2.90 |
| 10 | 50% $PA_2$ + 50% (99.25% $PA_1$ + 0.75% $AS_1$) | 3.35 |
| 11 | 50% $PA_2$ + 50% ($PA_1$ + Nucleant) | 3.35 |
| 12 | 50% $PA_1$ + 50% $PA_6$ | 3.35 |
| 13 | 50% $PA_2$ + 50% $PA_7$ | 3.35 |
| 14 | 80% $PA_2$ + 20% $PA_1$ | 3.35 |
| 15 | 80% $PA_2$ + 20% $PA_1$ | 2.90 |
| 16 | 80% $PA_2$ + 20% (99.25% $PA_1$ + 0.75% $AS_1$) | 3.35 |
| 17 | 80% $PA_2$ + 20% ($PA_1$ + Nucleant) | 3.35 |
| 18 (Comparative) | 80% $PA_6$ + 20% $I_1$ | 3.35 |
| 19 | 80% $PA_2$ + 20% $PA_4$ | 3.35 |
| 20 | 50% $PA_2$ + 50% $PA_4$ | 3.35 |

Parallel plate (PP) and variable pressure hot burst (VPHB) tests were conducted on the materials of Table 2.

The Parallel Plate Burst Test involves confining a bag between two plates within a chamber and inflating the bag until its seal fails. The pressure level inside the bag at the point of failure is an important measure of seal quality. A parallel plate burst station, Cryovac Model No. CE 10-128-1D was used. The plates were four inches apart, and the supply pressure was 10 psi calibrated, set static. Room temperature varied between 70° and 78° F. Clamped air pressure varied between 40 and 50 psi. The testing procedure involved cutting long bags to 26 inches, and using bags shorter than 26 inches at the produced length. A clear plastic cover on top of the burst chamber was removed and a bag was inserted into the chamber with its open end pulled up through the round neck of the chamber. The end of the bag was evenly folded over the neck one to three inches, and a nozzle inserted. The chamber was closed, and any air pressure from a previous test was released. The bag was sealed off and inflated, and a burst gauge recorded and held the pressure reached at burst.

The Variable Pressure Hot Burst Test is a test to determine the seal quality of shrinkable materials at different temperatures. The approach with this test is to immerse total sealed areas into hot water and after a predetermined dwell time, the pressure inside the bag is increased at a constant rate of approximately 25.4 mm of water per second until the seal fails. The millimeters of water pressure, at the level at which the seal fails, are recorded. Minimum specifications are expressed in mm for each bag width. The higher the number, the better the seal quality at that temperature.

In Table 3, the PP and VPHB values at the time that the packaging material was converted into bags is listed for each of Examples 2 through 20.

Because sealing wire current can vary in a bag making operation, burst data for two different current settings was analyzed. The bags used for testing had been stored at 25% relative humidity, and at 73° F.

The values for each test are IOWP (inches of water pressure).

For each set of tests, the average and standard deviation is indicated in separate columns.

TABLE 3

| | Burst Values at Converting | | | | | | | |
|---|---|---|---|---|---|---|---|---|
| | PP @ 27 amp | | PP @ 26 amp | | VPHBG @ 27 amp | | VPHBG @ 26 | |
| Example | Avg. (IOWP) | Std. Dev. (IOWP) | Avg. (IOWP) | Std. Dev. (IOWP) | Avg. (S) | Std. Dev. (S) | Avg. (S) | Std. Dev. (S) |
| 2 | 222.1 | 3.44 | 221.0 | 9.24 | 161.6 | 5.13 | 147.0 | 8.69 |
| 3 | 229.6 | 6.75 | 233.6 | 6.58 | 141.2 | 11.9 | 146.0 | 8.97 |
| 4 | 236.1 | 5.43 | 233.4 | 3.31 | 179.8 | 11.4 | 166.6 | 11.9 |
| 5 | 137.9 | 9.04 | 144.3 | 5.79 | 92.6 | 8.38 | 81.2 | 23.8 |
| 6 | 181.4 | 5.47 | 184.3 | 4.96 | 187.4 | 17.5 | 159.8 | 7.69 |
| 7 | 228.4 | 1.72 | 240.1 | 7.40 | 238.2 | 40.0 | 234.8 | 21.5 |
| 8 | 252.1 | 2.19 | 240.7 | 4.03 | 244.8 | 31.4 | 221.3 | 22.0 |
| 9 | 238.4 | 3.31 | 228.9 | 2.61 | 238.4 | 3.31 | 228.9 | 20.2 |
| 10 | 256.0 | 2.16 | 255.9 | 2.61 | 247.0 | 46.6 | 237.0 | 32.7 |
| 11 | 254.4 | 1.62 | 248.6 | 2.37 | 216.2 | 29.8 | 234.4 | 29.1 |
| 12 | 257.6 | 2.22 | 253.7 | 2.63 | 247.2 | 38.0 | 263.4 | 8.65 |
| 13 | 212.1 | 1.07 | 217.6 | 2.94 | 207.6 | 24.7 | 274.8 | 48.0 |
| 14 | 259.0 | 4.20 | 260.3 | 1.60 | 259.0 | 4.20 | 206.2 | 12.0 |

TABLE 3-continued

| | Burst Values at Converting | | | | | | | |
|---|---|---|---|---|---|---|---|---|
| | PP @ 27 amp | | PP @ 26 amp | | VPHBG @ 27 amp | | VPHBG @ 26 | |
| Example | Avg. (IOWP) | Std. Dev. (IOWP) | Avg. (IOWP) | Std. Dev. (IOWP) | Avg. (S) | Std. Dev. (S) | Avg. (S) | Std. Dev. (S) |
| 15 | 251.7 | 6.29 | 243.9 | 3.76 | 251.7 | 6.29 | 247.6 | 40.7 |
| 16 | 261.9 | 0.69 | 261.9 | 0.90 | 261.9 | 0.69 | 234.2 | 43.0 |
| 17 | 256.6 | 1.99 | 256.7 | 1.98 | 245.8 | 29.2 | 257.8 | 23.5 |
| 18 | 208.1 | 9.56 | 203.7 | 6.99 | 162.0 | 9.67 | 188.8 | 19.9 |
| 19 | 214.0 | 9.87 | 212.4 | 6.63 | 284.6 | 40.5 | 243.6 | 11.0 |
| 20 | 276.3 | 12.1 | 263.6 | 6.11 | 349.6 | 34.6 | 285.0 | 23.0 |

Burst data of bags stored at ambient temperature for 180 days after converting was also compiled for many of the example films. The results are listed in Table 4.

The values for the variable pressure hot burst are expressed in seconds (S). The heading "VPHBW" indicates that the variable pressure hot burst test was done with water (W) inside the bag. The heading "VPHBG" indicates that the variable pressure hot burst test was done with grease, in this case peanut oil (G) inside the bag.

TABLE 4

| | Burst Data Of Bags Stored At Ambient Temperature For 180 Days After Converting | | | | | | | | | | | |
|---|---|---|---|---|---|---|---|---|---|---|---|---|
| Ex- am- ple | PP (IOWP) @ 27 AMP | | PP (IOWP) @ 26 AMP | | VPHBW (S) @ 27 AMP | | VPHBW (S) @ 26 AMP | | VPHBG (S) @ 27 AMP | | VPHBG (S) @ 26 AMP | |
| | AVE | STD DEV | AVE | STD DEV | AVE | STD DEV | AVE | STD DEV | AVE | STD DEV | AVE | STD DEV |
| 2 | 197 | 2.1 | 191 | 7.7 | 126 | 11.2 | 128 | 8.8 | 108 | 2.5 | 110 | 13.9 |
| 5 | 137 | 9.7 | 157 | 10.7 | 94 | 11.2 | 117 | 2.5 | 53 | 8.3 | 72 | 3.1 |
| 6 | 192 | 9.3 | 211 | 8.4 | 116 | 3.7 | 128 | 6.8 | 116 | 4.8 | 101 | 1.4 |
| 7 | 229 | 1.4 | 236 | 5.1 | 144 | 8.7 | 142 | 6.4 | 121 | 13.7 | 120 | 16.1 |
| 8 | 245 | 3.7 | 236 | 2.7 | 97 | 2.1 | 91 | 6.2 | 155 | 17.9 | 119 | 4.1 |
| 10 | 246 | 1.5 | 243 | 2.0 | 126 | 6.2 | 111 | 3.2 | 153 | 10.6 | 140 | 3.5 |
| 12 | 248 | 1.5 | 250 | 4.6 | 109 | 10.1 | 97 | 5.7 | 149 | 19.4 | 152 | 20.8 |
| 13 | 208 | 1.5 | 207 | 2.7 | 165 | 18.7 | 150 | 9.7 | 151 | 22.5 | 185 | 5.1 |
| 14 | 255 | 6.8 | 253 | 2.4 | 112 | 7.9 | 110 | 3.9 | 117 | 9.4 | 114 | 9.6 |
| 16 | 254 | 2.7 | 256 | 0.8 | 141 | 11.1 | 143 | 6.1 | 159 | 14.8 | 161 | 15.4 |
| 18 | 204 | 1.5 | 202 | 2.0 | 140 | 19.5 | 169 | 11.5 | 202 | 12.2 | 180 | 30.2 |
| 19 | 208 | 13.5 | 213 | 10.2 | 147 | 15.6 | 140 | 7.5 | 187 | 21.9 | 187 | 33.8 |
| 20 | 251 | 11.6 | 242 | 9.7 | 100 | 19.7 | 73 | 6.1 | 217 | 24.2 | 190 | 17.4 |

Several of the example materials were tested in high humidity cook tests. Results are listed in Table 5.

TABLE 5

| | Percent Rejects During High Humidity Cook Tests | | | | | | | |
|---|---|---|---|---|---|---|---|---|
| Ex- am- ple | 190° F. | | | | 200° F. | | | |
| | 3 Hr. | 4 Hr. | 6 Hr. | Sur- vived | 3 Hr. | 4 Hr. | 6 Hr. | Sur- vived |
| 2 | — | — | — | 100% | — | — | — | 100% |
| 4 | — | — | — | 100% | — | — | — | 100% |
| 8 | — | — | — | 100% | 33% | — | 33% | 33% |
| 9 | — | — | — | 100% | — | 30% | — | 70% |
| 10 | — | — | — | 100% | — | — | — | 100% |
| 11 | — | — | — | 100% | — | — | 30% | 70% |
| 14 | 100% | — | — | — | 100% | — | — | — |
| 15 | 100% | — | — | — | 100% | — | — | — |
| 16 | 5% | 15% | 20% | 60% | 67% | — | — | 33% |
| 17 | — | 25% | 40% | 35% | — | 75% | — | 25% |

Several of the example structures were also tested in an impact tester using an 11 inch head and 5 or 11.5 pounds of additional head weight employed using the maximum drop height. The results are shown in Table 6.

TABLE 6

| | Rejects of Bags During Impact Testing | | |
|---|---|---|---|
| | Unrefrigerated Impact | | Refrigerated Impact |
| Example | 5 lbs. | 11.5 lbs. | 5 lbs. |
| 2 | 8.3% | 15.0% | 46.7% |

TABLE 6-continued

| | Rejects of Bags During Impact Testing | | |
|---|---|---|---|
| | Unrefrigerated Impact | | Refrigerated Impact |
| Example | 5 lbs. | 11.5 lbs. | 5 lbs. |
| 4 | 1.7% | 10.0% | 58.3% |
| 8 | 0% | 0% | 0% |
| 9 | 0% | 0% | 0% |
| 10 | 0% | 0% | 1.7% |
| 11 | 0% | 0% | 3.3% |
| 14 | 0% | | |
| 15 | 0% | | |
| 16 | 0% | | 0% |
| 17 | 0% | | 0% |

While the invention has been described with respect to preferred embodiments, those skilled in the art will understand that modifications and variations in the film structure and the composition of the respective layers can be made without departing from the spirit and scope of the claims as presented below.

In use, bags are made from the heat-shrinkable film, as discussed above, to form either end-seal or side-seal bags. Eventually, the bags are loaded with a food product, vacuumized and sealed, and subjected to cook-in treatment in near boiling water. During this food treatment, (1) bags (a) maintain good seal integrity, (b) do not delaminate and (c) heat shrink to form a neatly packaged pretreated food product, and (2) the first food contact layer (the inner layer of the bag) adheres to the contained food product to enhance weight yield of the cooked food product, and improve the appearance of the final package before it is opened (in the case of transparent film) and the appearance of the food product after the package is opened (transparent as well as printed films) by substantially preventing the accumulation of fluids between the film and the contained food product. Clipped casings can also be made from this film.

What is claimed is:

1. A multiple layer cook-in film, substantially conformable to a food contact layer, said first layer providing protein adhesion to said food product during cook in, said first layer comprising a blend of a first polyamide and a second polyamide.

2. The film of claim 1, wherein the polyamides are selected from the group consisting of nylon 6, nylon 11, nylon 12, nylon 66, nylon 610, nylon 6/9, nylon 6/10, nylon 6/12, nylon 69, nylon 612, nylon 12/12, a nylon produced from the polycondensation or polyaddition of any of the acid or amine compounds used to produce any of said nylons, a copolymer of any of said nylons, a terpolymer of any of said nylons, or a mixture thereof.

3. The film of claim 1, wherein said polyamide blend comprises between about 10% and 90% of nylon 12 and between about 90% and 10% of nylon 6/12.

4. The film of claim 1, wherein said film is biaxially oriented to an extent corresponding to a biaxial free shrinkage at 185° F. (185° C.) of up to about 55% (ASTM D 2732).

5. The film of claim 1, wherein the first layer (a) includes between about 0.01% and 5% of an antioxidant.

6. The film of claim 5, wherein the first layer includes between about 0.15% and 0.75% of an antioxidant.

7. The film of claim 1, wherein said film comprises the multilayer film structure: first food contact layer/second layer/barrier layer/abuse layer.

8. The film of claim 5, further including a polymeric adhesive layer located on each respective surface of the barrier layer.

9. The film of claim 1, wherein at least the first layer of the film is cross-linked.

10. The film of claim 9 wherein at least the first layer is subjected to an energetic radiation treatment to an extend corresponding to a dosage of up to about 12 MR.

* * * * *

UNITED STATES PATENT AND TRADEMARK OFFICE
CERTIFICATE OF CORRECTION

PATENT NO. : 5,213,900

DATED : May 25, 1993

INVENTOR(S) : Friedrich

It is certified that error appears in the above-identified patent and that said Letters Patent is hereby corrected as shown below:

Column 15, claim 1, line 3, after "food" insert —product, comprising a first—.

Signed and Sealed this

Twenty-sixth Day of April, 1994

Attest:

BRUCE LEHMAN

*Attesting Officer*  *Commissioner of Patents and Trademarks*